(12) United States Patent
Kimata

(10) Patent No.: US 8,576,934 B2
(45) Date of Patent: Nov. 5, 2013

(54) RECEIVING DEVICE, RECEIVING METHOD, AND PROGRAM

(75) Inventor: Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 12 days.

(21) Appl. No.: 13/378,635

(22) PCT Filed: Jul. 2, 2010

(86) PCT No.: PCT/JP2010/061319
§ 371 (c)(1),
(2), (4) Date: Dec. 15, 2011

(87) PCT Pub. No.: WO2011/002079
PCT Pub. Date: Jan. 6, 2011

(65) Prior Publication Data
US 2012/0093272 A1    Apr. 19, 2012

(30) Foreign Application Priority Data
Jul. 2, 2009 (JP) ................................ 2009-157844

(51) Int. Cl.
H04K 1/10 (2006.01)
H04L 27/28 (2006.01)

(52) U.S. Cl.
USPC ........... 375/260; 375/229; 375/232; 375/346; 375/350

(58) Field of Classification Search
USPC .......................... 375/260, 229–236, 346–350
See application file for complete search history.

(56) References Cited

U.S. PATENT DOCUMENTS

2002/0161560 A1 * 10/2002 Abe et al. ...................... 702/196
2009/0168910 A1 * 7/2009 Futatsugi et al. ............. 375/260
2009/0323796 A1 * 12/2009 Futatsugi et al. ............. 375/232

FOREIGN PATENT DOCUMENTS

| JP | 2001308763 A | 11/2001 |
|---|---|---|
| JP | 2003163630 A | 6/2003 |
| JP | 2008205697 A | 9/2008 |
| JP | 2009049491 A | 3/2009 |
| JP | 2009094831 A | 4/2009 |
| JP | 2009130516 A | 6/2009 |
| WO | 03021833 A | 3/2003 |
| WO | 2007119280 A | 10/2007 |
| WO | 2008047776 A | 4/2008 |
| WO | 2008090764 A | 7/2008 |

OTHER PUBLICATIONS

International Search Report for PCT/JP2010/061319 mailed Aug. 3, 2010.
D. Falconer et al., "Frequency Domain Equalization for Single-Carrier Broadband Wireless Systems", Wireband Wireless Access Technologies to Broadband Internet, IEEE Communication Magazine, vol. 40, No. 4, pp. 58-66, Apr. 2002.

* cited by examiner

*Primary Examiner* — Curtis Odom

(57) ABSTRACT

A receiving device includes a channel estimating section that performs a correlating process for a received reference signal in which a single carrier signal was transformed into a frequency domain signal and a pre-stored reference signal so as to obtain estimated channel values; a compensation coefficient computing section that computes compensation coefficients corresponding to residual multipath interferences based on a bit likelihood; a weight computing section that computes equalized weights based on the estimated channel values and the compensation coefficients; an equalizing filter that generates an equalized signal by equalizing process for the received signal that is the frequency domain signal based on the equalized weights; a residual interference replica generating section that generates residual multipath interference replicas based on frequency domain symbol replicas, the estimated channel values, and the equalized weights; and a subtracting section that subtracts the residual multipath interference replicas from the equalized signal.

9 Claims, 5 Drawing Sheets

RECEIVING DEVICE, RECEIVING METHOD, AND PROGRAM

TECHNICAL FIELD

The present invention relates to a receiving device, a receiving method, and a program.

BACKGROUND ART

Uplink wireless systems for next-generation mobile communication need to accomplish high transmission power efficiency so as to allow terminals to have a wide coverage. Thus, a single carrier system that suppresses the PAPR (Peak to Average Power Ratio) has been regarded as the most likely candidate to the next-generation mobile communication systems.

Although it is important for the next-generation mobile communication systems to accomplish high speed data transmission, if high speed data transmission is performed using a single carrier signal, a drawback of inter-symbol interferences due to multipath, namely multipath interferences, will arise.

Although multipath interferences are suppressed by various techniques, as a relative simple technique, a linier equalizer can be used. A frequency equalizer that performs a linear equalizing process that is a frequency domain signal process and thereby remarkably reduces the amount of computation has been proposed (for example, refer to Non-patent Literature 1).

The structure of single carrier receiving device 100 disclosed in Non-patent Literature 1 is shown in FIG. 1. Single carrier receiving device 100 disclosed in Non-patent Literature 1 is composed of receiving antenna 101, cyclic prefix (CP) removing section 102, discrete Fourier transform (DFT) section 103, channel estimating section 104, weight computing section 105, equalizing filter 106, inverse discrete Fourier transform (IDFT) section 107, bit likelihood computing section 108, and decoder 109.

As shown in FIG. 1, an output of CP removing section 102 is connected to DFT section 103 through a signal line. Outputs of DFT section 103 are connected to equalizing filter 106 and channel estimating section 104 through respective signal lines. Outputs of channel estimating section 104 are connected to weight computing section 105 through respective signal lines. Outputs of weight computing section 105 are connected to equalizing filter 106 through respective signal lines. Outputs of equalizing filter 106 are connected to IDFT section 107 through respective signal lines. An output of IDFT section 107 is connected to bit likelihood computing section 108 through a signal line. An output of bit likelihood computing section 108 is connected to decoder 109 through a signal line.

Next, the operations of individual structural sections of receiving device 100 will be described.

Receiving antenna 101 receives a time domain single carrier signal.

CP removing section 102 inputs the time domain single carrier signal received from receiving antenna 101 and removes a portion corresponding to the CP from the time domain single carrier signal.

DFT section 103 inputs the received signal from which the CP was removed by CP removing section 102, performs an $N_{DFT}$-point DFT (where $N_{DFT}$ is an integer equal to or greater than 2), and outputs frequency domain subcarriers k (where $1 \leq k \leq N_{DFT}$) transformed from the received signal.

Channel estimating section 104 inputs the frequency domain subcarriers k as received reference signals transformed by DFT section 103 and performs a correlating process for the received input signals and a pre-stored reference signal so as to obtain estimated channel values.

For example, estimated channel values H(k) of subcarriers k are computed as follows.

$$H(k)=R_{RS}(k)X^*(k) \qquad (1)$$

where X(k) are the reference signals, $R_{RS}(k)$ are the received reference signals transformed into frequency domain signals by DFT section 103, and superscript * represents a complex conjugate.

Weight computing section 105 inputs the estimated channel values of the frequency domain subcarriers k estimated by channel estimating section 104 and computes equalized weights. The equalized weights are computed by weight computing section 105 generally according to the minimum mean square error (MMSE) technique. MMSE weights W(k) of subcarriers k are computed based on the estimated channel values H(k) as follows.

$$W(k)=(H^*(k))/(|H^*(k)|^2+\sigma^2) \qquad (2)$$

where $\sigma^2$ represents the noise power.

Equalizing filter 106 inputs the equalized weights computed by weight computing section 105 and the frequency domain subcarriers k transformed by DFT section 103 and multiplies the subcarriers by the equalized weights so as to perform an equalizing process for the frequency domain subcarriers k.

Assuming that the received data signals transformed by DFT section 103 are $R_D(k)$ and the equalized weights computed by weight computing section 105 are W(k), equalized signals Y(k) for which the equalizing process was performed by equalizing filter 106 are computed as follows.

$$Y(k)=W(k)R_D(k) \qquad (3)$$

IDFT section 107 inputs the equalized signals of frequency domain subcarriers k equalized by equalizing filter 106 and performs an $N_{IDFT}$-point IDFT (where $N_{IDFT}$ is an integer equal to or greater than 2) so as to transform the equalized signals into a time domain single carrier signal.

Bit likelihood computing section 108 inputs the equalized signal that is the time domain single carrier signal outputted from IDFT section 107 and computes the likelihood of each transmitted bit of the equalized signal. In the following, the computed bit-wise likelihood is referred to as the bit likelihood.

Decoder 109 inputs the bit likelihood computed by bit likelihood computing section 108 and performs error correction decoding based on the bit likelihood.

Patent Literature 1 discloses a receiving device that performs single carrier transmission according to the diversity receiving. Non-patent Literature 1 and Patent Literature 1 are as follows.

Patent Literature 1: JP2001-308763A, Publication
Non-patent Literature 1: D. Falconer, S. L. Ariyavisitakul, A. Benyamin-Seeyar, and B. Eidson,"Frequency Domain Equalization for Single-Carrier Broadband Wireless Systems, "IEEE Commun. Mag., vol. 40, no. 4, pp. 58-66, April 2002.

SUMMARY OF THE INVENTION

The receiving device shown in FIG. 1 has the following drawback. When high speed data transmission is conducted using a time domain single carrier signal, a frequency equalizer is used so as to suppress multipath interferences. The frequency equalizer of the receiving device shown in FIG. 1 is composed of channel estimating section 104, weight computing section 105, and equalizing filter 106.

At this point, the frequency equalizer in which weight computing section 105 uses only MMSE weights cannot completely compensate for frequency selectivity. Thus, there is a drawback in which multipath interferences reside in an equalized received signal and thereby characteristics deteriorate.

An exemplary object of the invention is to provide a receiving device, a receiving method, and a program that can decrease residual multipath while using a frequency equalizer that operates based on MMSE weights.

A receiving device according to an exemplary aspect of the invention, that is a receiving device which receives a single carrier signal, includes: a channel estimating section that performs a correlating process for a received reference signal in which the single carrier signal was transformed from a time domain signal into a frequency domain signal and a pre-stored reference signal so as to obtain estimated channel values; a compensation coefficient computing section that computes compensation coefficients corresponding to residual multipath interferences based on a bit likelihood; a weight computing section that computes equalized weights based on the estimated channel values and the compensation coefficients; an equalizing filter that generates an equalized signal by equalizing process for the received signal that is the frequency domain signal based on the equalized weights; a residual interference replica generating section that generates residual multipath interference replicas based on frequency domain symbol replicas, the estimated channel values, and the equalized weights; and a first subtracting section that subtracts the residual multipath interference replicas from the equalized signal, that are the frequency domain signal.

A receiving method according to an exemplary aspect of the invention, that is a receiving method of a receiving device which receives a single carrier signal, includes: performing a correlating process for a received reference signal in which the single carrier signal was transformed from a time domain signal into a frequency domain signal and a pre-stored reference signal so as to obtain estimated channel values; computing compensation coefficients corresponding to residual multipath interferences based on a bit likelihood; computing equalized weights based on the estimated channel values and the compensation coefficients; generating an equalized signal by equalizing process for the received signal that is the frequency domain signal based on the equalized weights; generating residual multipath interference replicas based on frequency domain symbol replicas, the estimated channel values, and the equalized weights; and subtracting the residual multipath interference replicas from the equalized signal, that are the frequency domain signal.

A recording medium according to an exemplary aspect of the invention, that is a recording medium that records a program which causes a signal processing section of a receiving device which receives a single carrier signal to operate, includes the processes of: performing a correlating process for a received reference signal in which the single carrier signal was transformed from a time domain signal into a frequency domain signal and a pre-stored reference signal so as to obtain estimated channel values; computing compensation coefficients corresponding to residual multipath interferences based on a bit likelihood; computing equalized weights based on the estimated channel values and the compensation coefficients; generating an equalized signal by equalizing process for the received signal that is the frequency domain signal based on the equalized weights; generating residual multipath interference replicas based on frequency domain symbol replicas, the estimated channel values, and the equalized weights; and subtracting the residual multipath interference replicas from the equalized signal, that are the frequency domain signal.

BEST MODES THAT CARRY OUT THE INVENTION (Description of Structure of Receiving Device According to this Embodiment)

Figure 2:
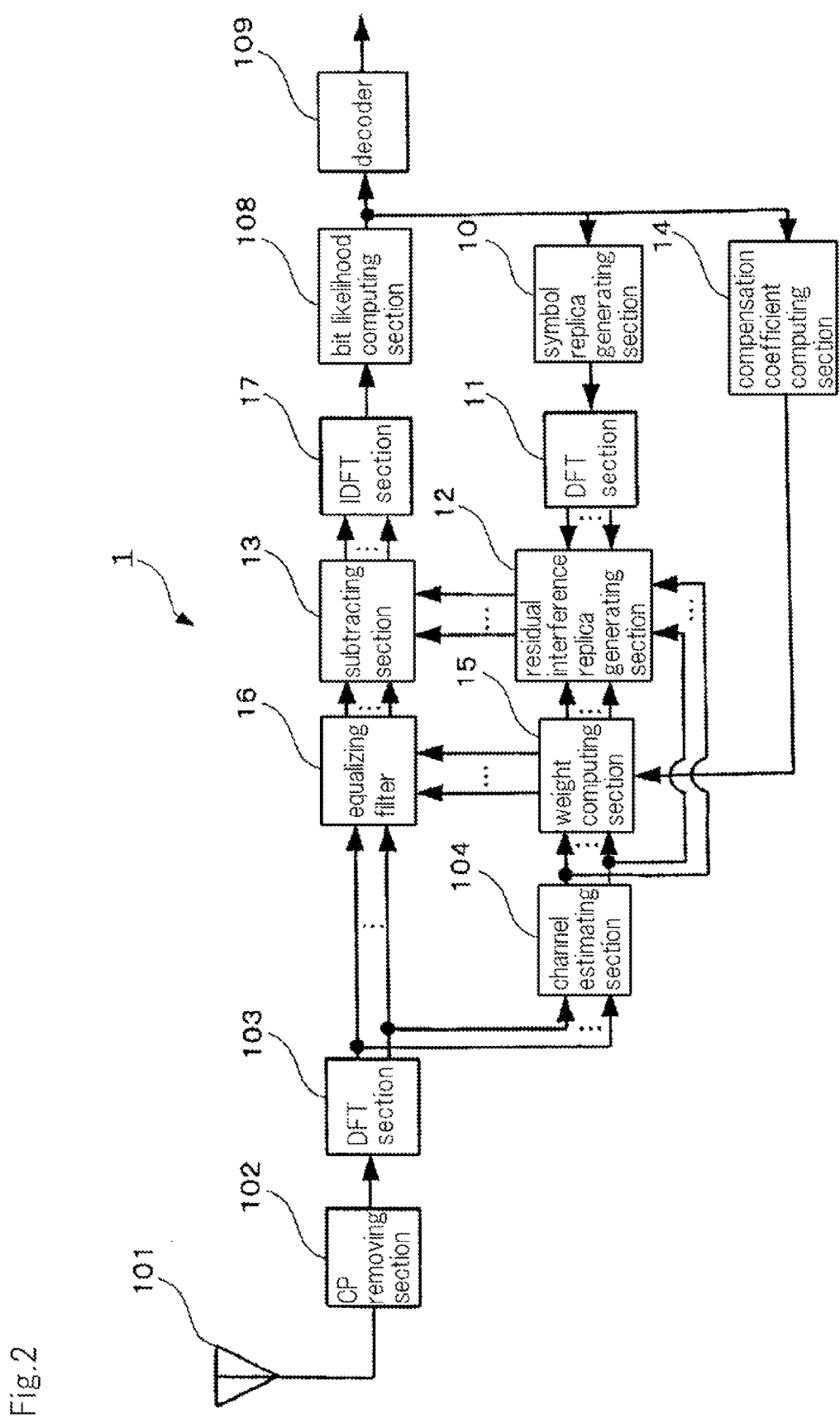
FIG. 2 is a block diagram exemplifying the structure of a receiving device according to an embodiment of the present invention.

Here, the structure of a receiving device according to an embodiment of the present invention will be described. FIG. 2 is a block diagram exemplifying the structure of the receiving device according to this embodiment.

Figure 1:
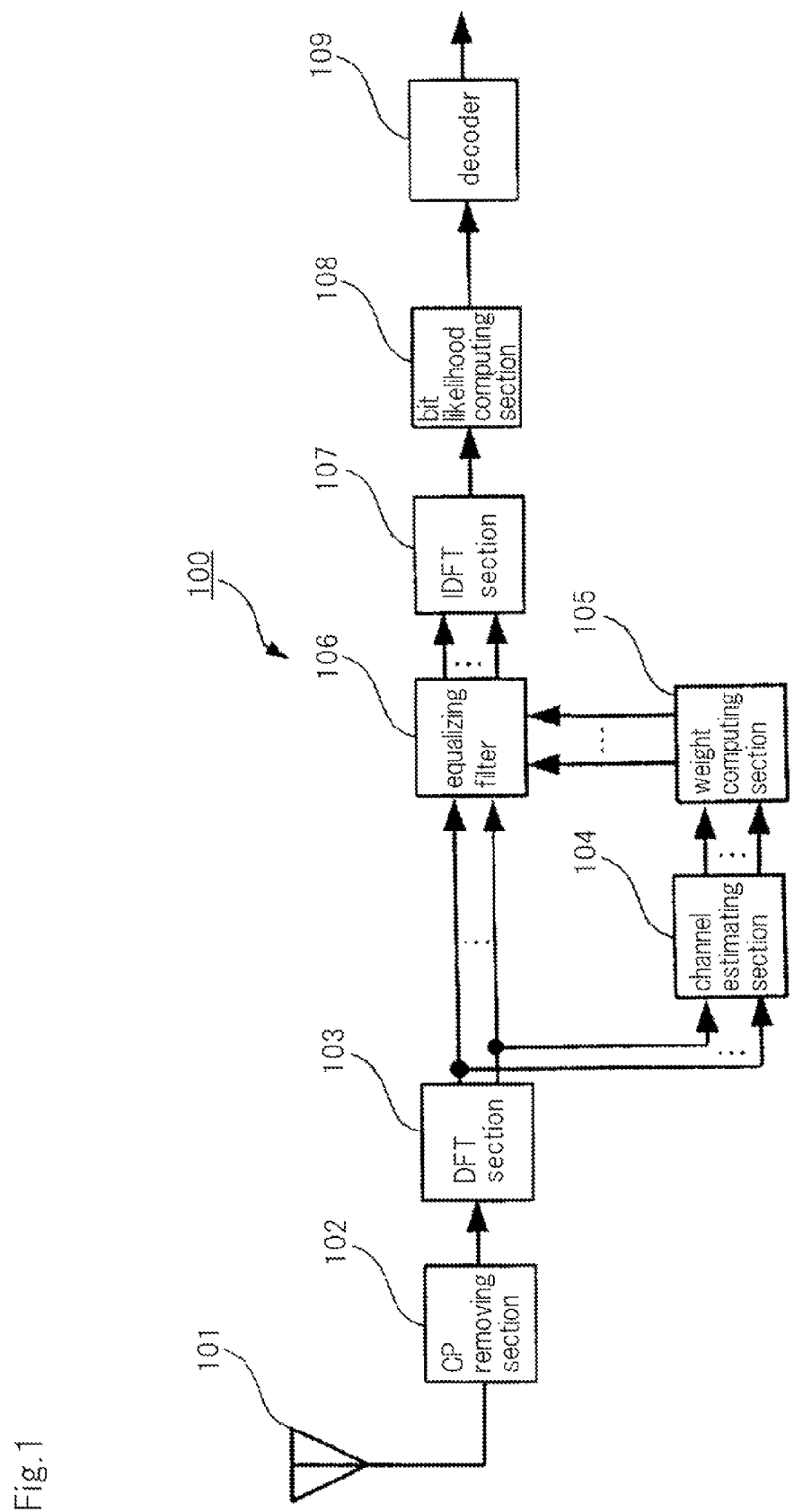
FIG. 1 is a block diagram showing a receiving device disclosed in Non-patent Literature 1.

It is assumed that receiving device 1 according to this embodiment is a single carrier receiving device that transforms a time domain single carrier signal into frequency domain i-th (where i is an integer equal to or greater than 1) iterative subcarriers k. Similar structural sections to those of receiving device 100 shown in FIG. 1 are denoted by similar reference numerals and their detailed description will be omitted.

As shown in FIG. 2, like receiving device 100 described with reference to FIG. 1, receiving device 1 has receiving antenna 101, CP removing section 102, DFT section 103, channel estimating section 104, bit likelihood computing section 108, and decoder 109.

Receiving device 1 also has symbol replica generating section 10, DFT section 11, residual interference replica generating section 12, and subtracting section 13 in addition to the sections of receiving device 100 described with reference to FIG. 1. Note that although weight computing section 15, equalizing filter 16, and IDFT section 17 basically have similar structures to those of weight computing section 105, equalizing filter 106, and IDFT section 107, they differ in processing targets and signal types.

In receiving device 1, as shown in FIG. 2, outputs of equalizing filter 16 are connected to subtracting section 13 through respective signal lines. Outputs of subtracting section 13 are connected to IDFT section 17 through respective signal lines. Outputs of bit likelihood computing section 108 are connected to decoder 109, symbol replica generating section 10, and compensation coefficient computing section 14 through respective signal lines. An output of symbol replica generating section 10 is connected to DFT section 11 through a signal line. Outputs of DFT section 11 are connected to residual interference replica generating section 12 through respective signal lines.

Outputs of channel estimating section 104 are connected to weight computing section 15 and residual interference replica generating section 12 through respective signal lines. An output of compensation coefficient computing section 14 is connected to weight computing section 15 through a signal line. Outputs of weight computing section 15 are connected to equalizing filter 16 and residual interference replica generating section 12 through respective signal lines. Outputs of residual interference replica generating section 12 are connected to subtracting section 13 through respective signal lines.

(Description of Operations of Receiving Device 1 According to this Embodiment)

Next, the operations of receiving device 1 according to this embodiment will be described. Here, description of similar operations to those of receiving device 100 shown in FIG. 1 will be omitted.

Weight computing section 15 inputs estimated channel values of frequency domain i-th iterative subcarrier k estimated by channel estimating section 104 and a compensation coefficient corresponding to a residual multipath interference computed by compensation coefficient computing section 14 and computes equalized weights based on the estimated channel values and the compensation coefficient.

At this point, MMSE weights $W^{(i)}(k)$ of the i-th iterative subcarriers k are computed using estimated channel values $H(k)$ and a compensation coefficient $\rho(i-1)$ corresponding to the (i−1)-th iterative residual multipath interference as follows.

$$W^{(i)}(k)=(H^*(k))/(\rho^{(i-1)}|H(k)|^2+\sigma^2) \quad (4)$$

where $\sigma^2$ represents the noise power and $\rho^{(-1)}=1$.

Equalizing filter 16 inputs the equalized weights computed by weight computing section 15 and the frequency domain i-th iterative subcarriers k transformed by DFT section 103 and multiplies the subcarriers by the equalized weights so as to perform an equalizing process for the frequency domain i-th iterative subcarriers k.

Assuming that the frequency domain i-th iterative subcarriers k transformed by DFT section 103 are denoted by $R_D(k)$ and the equalized weights computed by weight computing section 15 are denoted by $W^{(i)}(k)$, equalized signals $Y^{(i)}(k)$ equalized by equalizing filter 16 are calculated as follows.

$$Y^{(i)}(k)=W^{(i)}(k)R_D(k) \quad (5)$$

Subtracting section 13 subtracts residual multipath interference replicas generated by residual interference replica generating section 12 from the equalized frequency domain signals equalized by equalizing filter 16. As a result, the residual multipath interferences are removed.

At this point, assuming that the residual multipath interference replicas generated by residual interference replica generating section 12 are denoted by $M^{(i)}(k)$, equalized signals $Y^{(i)}_{rmv}(k)$ in which the residual multipath interferences were removed by subtracting section 13 is represented as follows.

$$Y^{(i)}_{rmv}(k)=Y^{(i)}(k)-M^{(i)}(k) \quad (6)$$

IDFT section 17 inputs the equalized signals of the frequency domain i-th iterative subcarriers k in which the residual multipath interferences were removed, performs an $N_{IDFT}$-point IDFT (where $N_{IDFT}$ is an integer equal to or greater than 2) for the input equalized signals, and transforms the equalized signals in which the residual multipath interferences were removed into a time domain single carrier signal.

Symbol replica generating section 10 inputs the bit likelihood computed by bit likelihood computing section 108 and generates a symbol replica based on the bit likelihood. Techniques that can generate symbol replicas include a technique that generates a hard decision symbol replica, a technique that generates a hard decision symbol replica and multiplies it by a predetermined replica weighting coefficient (a constant equal to or less than 1), and a technique that generates a soft decision symbol replica.

Although the structure shown in FIG. 2 uses a technique that generates a symbol replica based on demodulated bits, a technique that generates a symbol replica based on error-corrected bits may be used so as to generate a highly accurate replica.

DFT section 11 inputs the symbol replica generated by symbol replica generating section 10, performs an $N_{DFT}$-point DFT (where $N_{DFT}$ is an integer equal to or greater than 2) for the symbol replica, and transforms the symbol replica into frequency domain i-th iterative subcarriers k.

Residual interference replica generating section 12 inputs symbol replicas of the frequency domain i-th iterative subcarriers k transformed by DFT section 11, the estimated channel values of the frequency domain i-th iterative subcarriers k estimated by channel estimating section 104, and the equalized weights computed by weight computing section 15 and thereby generates the residual multipath interference replicas based on these input values.

Compensation coefficient computing section 14 inputs the bit likelihood computed by bit likelihood computing section 108 and computes a compensation coefficient $\rho^{(i-1)}$ corresponding to the residual multipath interference based on the bit likelihood.

(Description of Structure of Residual Interference Replica Generating Section 12)

Figure 3:
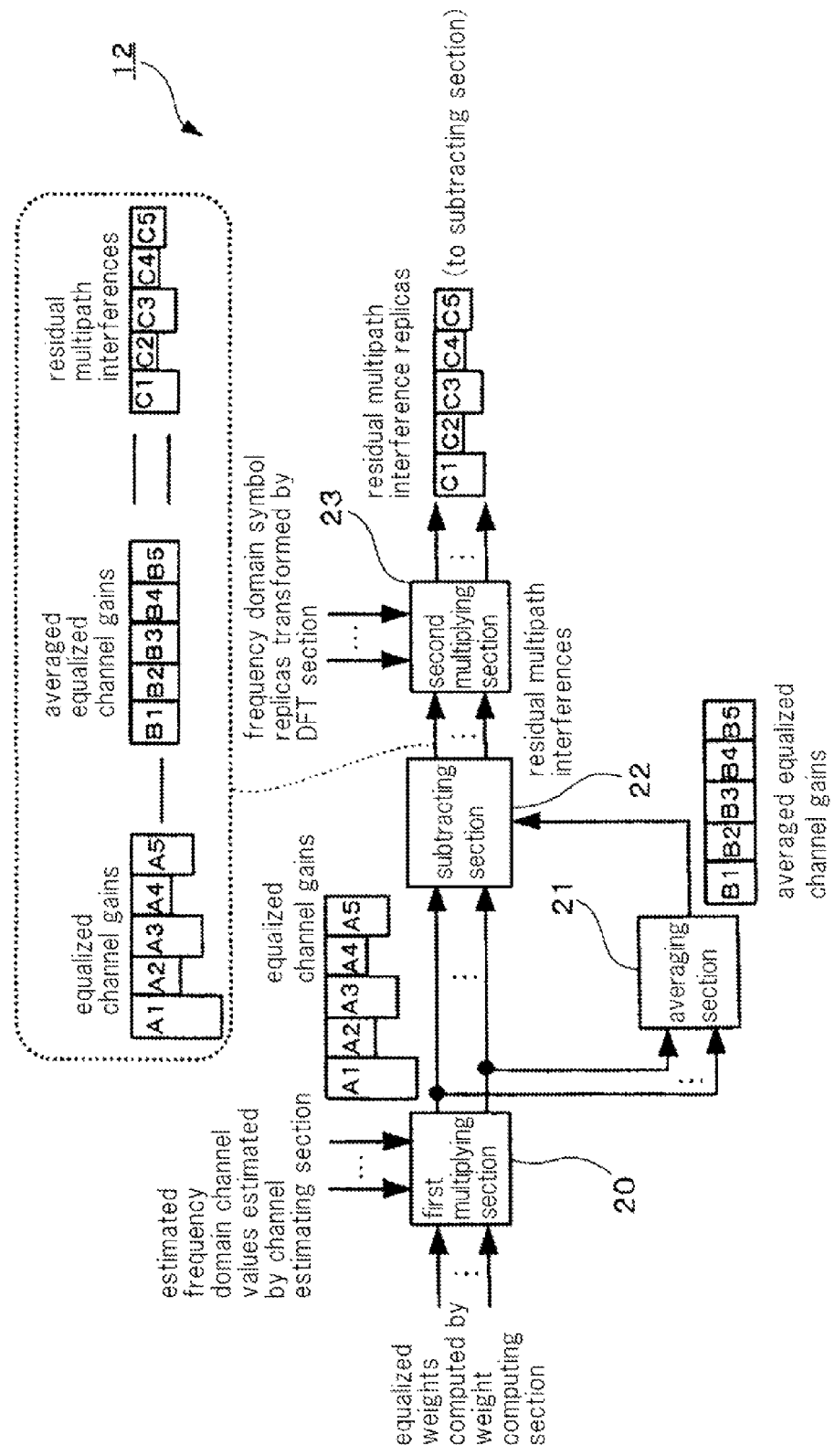
FIG. 3 is a block diagram exemplifying the structure of a residual interference replica generating section shown in FIG. 2.

Next, with reference to FIG. 3, the structure of residual interference replica generating section 12 will be described. FIG. 3 is a block diagram exemplifying the structure of residual interference replica generating section 12. Residual interference replica generating section 12 is composed of first multiplying section 20, averaging section 21, subtracting section 22, and second multiplying section 23.

As shown in FIG. 3, outputs of first multiplying section 20 are connected to subtracting section 22 and averaging section 21 through respective signal lines. Outputs of subtracting section 22 are connected to second multiplying section 23 through respective signal lines.

(Description of Operations of Residual Interference Replica Generating Section 12)

Next, with reference to FIG. 3, the operations of residual interference replica generating section 12 will be described.

First multiplying section 20 inputs estimated channel values of frequency domain i-th iterative subcarriers k estimated by channel estimating section 104 and equalized weights computed by weight computing section 15 and multiplies the estimated channel values by the equalized weights so as to compute equalized channel gains.

Averaging section 21 averages equalized channel gains of $N_{DFT}$ point subcarriers computed by first multiplying section 20 so as to compute averaged equalized channel gains.

Subtracting section 22 subtracts the averaged equalized channel gains computed by averaging section 21 from the equalized channel gains computed by first multiplying section 20 so as to compute residual multipath interferences.

Second multiplying section 23 inputs the residual multipath interferences computed by subtracting section 22 and the frequency domain symbol replicas transformed by DFT section 11, multiplies the residual multipath interferences by the symbol replicas, generates residual multipath interference replicas, and sends them to subtracting section 13 shown in FIG. 2.

Assuming that the averaged equalized channel gain is denoted by $G^{(i)}$, the residual multipath interference replicas $M^{(i)}(k)$ generated by residual interference replica generating section 12 is expressed as follows.

$$G^{(i)} = (1/N_{DFT}) \Sigma_{K=1 \text{ to } NDFT} W^{(i)}(k) H^{(i)}(k) \qquad (7)$$

$$M^{(i)}(k) = [W^{(i)}(k) H^{(i)}(k) - G^{(i)}] S^{(i-1)}(k) \qquad (8)$$

where $S^{(i-1)}(k)$ represent symbol replicas of frequency domain (i−1)-th iterative subcarriers k transformed by DFT section 11; and $M^{(0)}=1$.

For easy understanding, FIG. 3 schematically shows that residual multipath interferences are extracted by subtracting section 22. The equalized channel gains and averaged equalized channel gains are denoted by rectangles A1 to A5 and B1 to B5, respectively. It is assumed that the heights of the rectangles A1 to A5 and B1 to B5 represent the levels of gains. In the example shown in FIG. 3, the heights of the rectangles A1, A3, and A5 of the equalized channel gains are greater than those of the rectangles B1 to B5 of the averaged equalized channel gains. Since the averaged equalized channel gains were averaged by averaging section 21, changes of the heights of the rectangles B1 to B5 are gradual compared to those of the rectangles A1 to A5 of the equalized channel gains.

Subtracting section 22 subtracts the averaged equalized channel gains from the equalized channel gains so as to extract rectangles C1 to C5 that represent residual multipath interferences. The heights of the rectangles C1 to C5 represent the levels of residual multipath interferences and are those in which the heights of the rectangles B1 to B5 are subtracted from those of the rectangles A1 to A5. In this example, although the equalized channel gains are greater than the averaged equalized channel gains, the later may be greater than the former.

Second multiplying section 23 multiplies the residual multipath interferences equivalent to the rectangles C1 to C5 by the frequency domain symbol replicas transformed by DFT section 11 so as to generate residual multipath interference replicas. In FIG. 3, the residual multipath interference replicas are represented as the rectangles C1 to C5.

(Description of Operations of Receiving Device 1 that Removes Residual Multipath Interferences)

Figure 4:
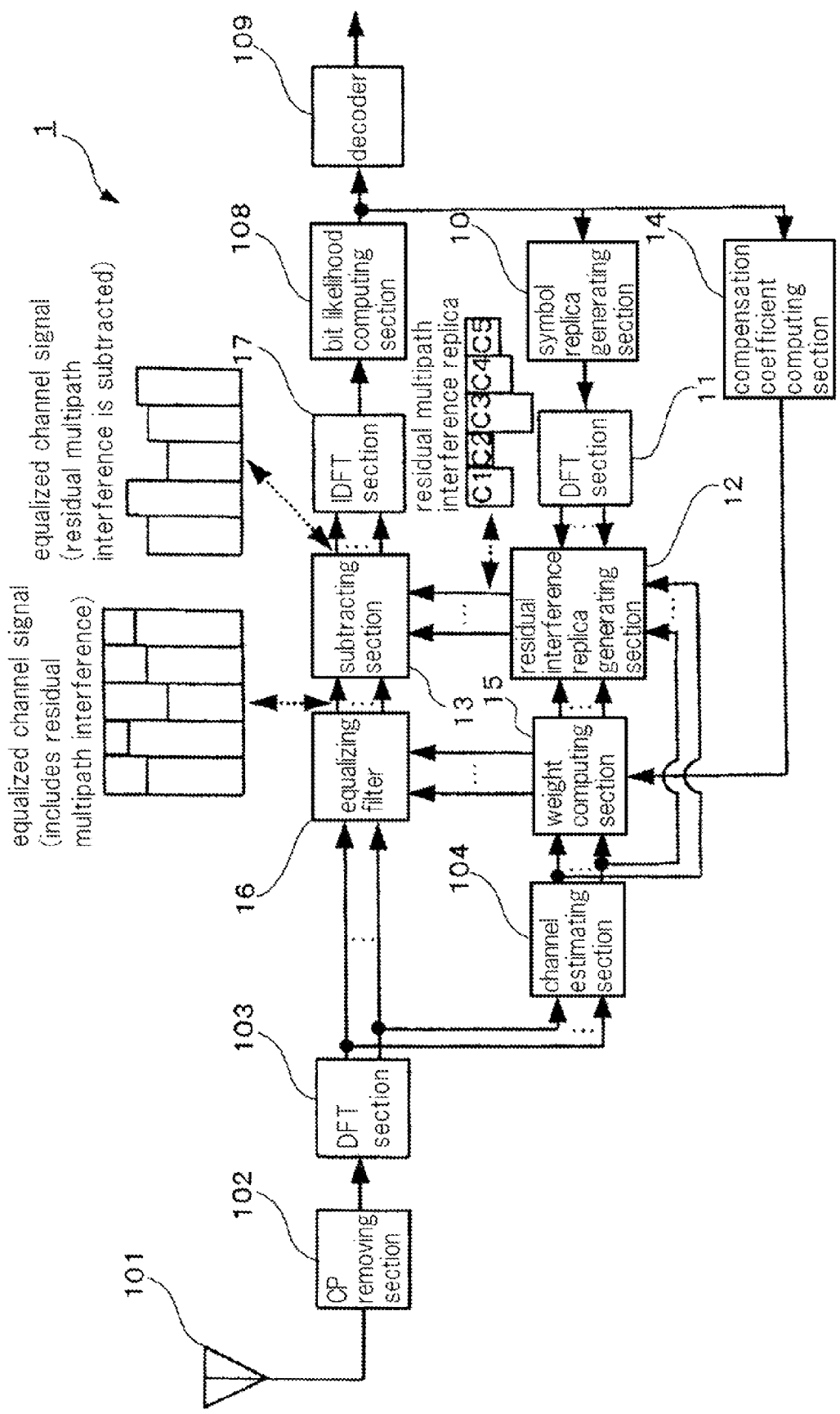
FIG. 4 is a schematic diagram describing operations of the receiving device according to this embodiment.

After the residual multipath interference replicas are generated by residual interference replica generating section 12, as shown in FIG. 4, subtracting section 13 subtracts the residual multipath interference replicas from the equalized channel signals (including residual multipath interferences) outputted from equalizing filter 16 so as to obtain equalized channel signals in which the residual multipath interferences were removed.

For easy understanding, also in FIG. 4, equalized channel signals containing residual multipath interferences and equalized channel signals in which residual multipath interference replicas were removed are represented as rectangles.

The residual multipath interference replicas (rectangles C1 to C5) generated by residual interference replica generating section 12 are subtracted from the equalized channel signals containing residual multipath interferences outputted from equalizing filter 16. Thus, equalized channel signals in which residual multipath interferences for residual multipath interference replicas were removed are output from subtracting section 13.

Receiving device 1 repeats the above-described processes for i iterations. In other words, processes of subtracting section 13→IDFT section 17→bit likelihood computing section 108→symbol replica generating section 10→DFT section 11→residual interference replica generating section 12→subtracting section 13, etc. and processes of subtracting section 13→IDFT section 17→bit likelihood computing section 108→compensation coefficient computing section 14→weight computing section 15→equalizing filter 16→residual interference replica generating section 12→subtracting section 13, etc. are performed for i iterations.

Thus, the residual multipath interferences that cannot be removed by processes for one iteration can be decreased by processes for i iterations.

(Description of Structure of Compensation Coefficient Computing Section 14)

Figure 5:
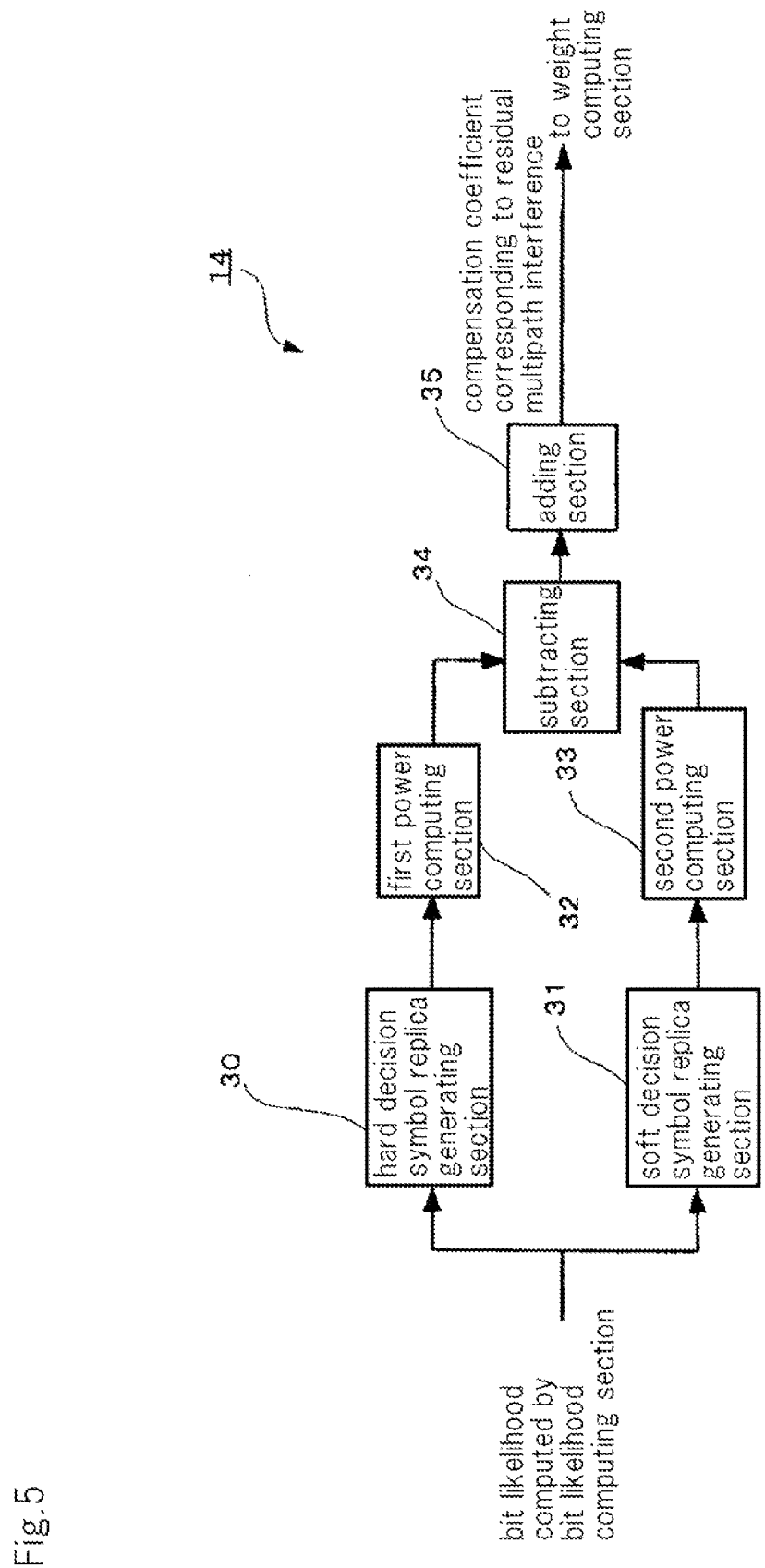
FIG. 5 is a block diagram exemplifying the structure of a compensation coefficient computing section shown in FIG. 2.

Next, with reference to FIG. 5, the structure of compensation coefficient computing section 14 will be described. FIG. 5 is a block diagram exemplifying the structure of compensation coefficient computing section 14. Compensation coefficient computing section 14 is composed of hard decision symbol replica generating section 30, soft decision symbol replica generating section 31, first power computing section 32, second power computing section 33, subtracting section 34, and adding section 35.

As shown in FIG. 5, an output of hard decision symbol replica generating section 30 is connected to first power computing section 32. An output of first power computing section 32 is connected to subtracting section 34. An output of soft decision symbol replica generating section 31 is connected to second power computing section 33. An output of second power computing section 33 is connected to subtracting section 34. An output of subtracting section 34 is connected to adding section 35.

(Description of Operations of Compensation Coefficient Computing Section 14)

Next, with reference to FIG. 5, the operations of compensation coefficient computing section 14 will be described. Hard decision symbol replica generating section 30 inputs the bit likelihood computed by bit likelihood computing section 108 and generates a hard decision symbol replica based on a bit likelihood. First power computing section 32 computes the power of the hard decision symbol replica for each symbol.

Here, a hard decision symbol replica will be described. A predetermined threshold is preset for a bit likelihood such that if the bit likelihood becomes equal to or greater than the threshold or exceeds the threshold, a symbol replica decided as "1" is generated and if the bit likelihood becomes less than the threshold or equal to or less than the threshold, a symbol replica decided as "0" is generated. A hard decision symbol replica is a symbol replica generated in such a manner.

Soft decision symbol replica generating section 31 inputs the bit likelihood computed by bit likelihood computing section 108 and generates a soft decision symbol replica based on the bit likelihood. Second power computing section 33 computes the power of the soft decision symbol replica for each symbol.

A soft decision symbol replica is a symbol replica having a decision value in proportion to the level of the bit likelihood.

Subtracting section 34 subtracts the power of the soft decision symbol replica computed by second power computing section 33 from the power of the hard decision symbol replica computed by first power computing section 32 for each symbol.

Adding section 35 adds subtracted results obtained for $N_{DFT}$ symbols by subtracting section 34 so as to compute a compensation coefficient $\sigma^{(i-1)}$ corresponding to a residual multipath interference and sends it to weight computing section 15 shown in FIG. 2.

According to this embodiment, residual multipath interferences are computed based on equalized channel gains computed based on estimated channel values and equalized weights, processes of equalized weights, equalized filter, and residual multipath interference removal are iteratively performed, and thereby residual multi-path interferences are removed, resulting in accomplishing excellent receiving characteristics.

Other Embodiments

The above-described embodiment of the present invention can be changed in various manners without departing from the spirit of the present invention. For example, in the above-described embodiment, a time domain signal is transformed into a frequency domain signal according to the DFT, whereas a frequency domain signal is transformed into a time domain signal according to the IDFT. They may be performed according to the fast Fourier transform (FFT) and the inverse fast Fourier transform (IFFT) or other signal transform algorithms.

In addition, the above-described embodiment is exemplified as a single carrier receiving device that has one transmission antenna and one reception antenna. Instead, the MIMO (Multiple Input Multiple Output) system that has multiple reception antennas and multiple transmission antennas or a diversity receiving system that has a plurality of receiving antennas may be used.

In addition, the above-described embodiment can be applied to both a base station wireless device and a mobile station wireless device of a mobile communication system.

The above-described embodiment described that residual multipath interferences are removed by processes for i iterations corresponding to i iterative subcarriers k. This represents the most preferred iterations, not limited thereto. In addition, as described above, although it is preferred that i iterations are 2 or greater; even if i=1, since part of residual multipath interferences is removed from the received signal, the receiving characteristics are improved compared to the technique described in the Background Art.

In receiving device 1, whenever the above-described processes are iteratively performed, residual multipath interferences are gradually removed and finally a decoded result in which residual multipath interferences were remarkably reduced is obtained. Thus, it is preferred that a selecting process that validates only the final decoded result be performed downstream of decoder 109. Alternatively, a switch may be provided between bit likelihood computing section 108 and decoder 109 such that while the processes are iteratively being executed, the switch is turned off and when the iteration process is completed, the switch is turned on and thereby the final result is input to decoder 109.

The structure and operations of the receiving device according to the above-described embodiment were described with reference to the foregoing functional block diagram. Instead, part of functions of receiving device 1 may be accomplished by causing a CPU (Central Processing Unit) to execute a program. For example, a memory (not shown) that stores the program and the CPU (not shown) that executes processes according to the program are provided in the receiving device and by causing the CPU to execute the program, equalizing filter 16, subtracting section 13, channel estimating section 104, weight computing section 15, residual interference replica generating section 12, and compensation coefficient computing section 14 shown in FIG. 2 are virtually structured in the receiving device. In this case, not only the program that codes the contents of the signal process in the receiving method according to the above-described embodiment, but a recording medium that records the program become the subject matter of the present invention.

In the receiving device according to the present invention, to execute the most characteristic processes, at least equalizing filter 16, subtracting section 13, channel estimating section 104, weight computing section 15, residual interference replica generating section 12, and compensation coefficient computing section 14 are required of those of the structure shown in FIG. 2.

As an exemplary advantage according to the invention, residual multipath can be reduced by a frequency equalizer using MMSE weights.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2009-157844 filed on Jul. 2, 2009, the content of which is incorporated by reference.

DESCRIPTION OF REFERENCE NUMERALS

1 Receiving device
10 Symbol replica generating section
11 DFT section
12 Residual interference replica generating section
13, 22, 34 Subtracting section
14 Compensation coefficient computing section
15 Weight computing section
16 Equalizing filter
17 IDFT section
20 First multiplying section
21 Averaging section
23 Second multiplying section
30 Hard decision symbol replica generating section
31 Soft decision symbol replica generating section
32 First power computing section
33 Second power computing section
35 Adding section

The invention claimed is:

1. A receiving device that receives a single carrier signal, comprising:
a channel estimating section that performs a correlating process for a received reference signal in which said single carrier signal was transformed from a time domain signal into a frequency domain signal and a pre-stored reference signal so as to obtain estimated channel values;
a compensation coefficient computing section that computes compensation coefficients corresponding to residual multipath interferences based on a bit likelihood;
a weight computing section that computes equalized weights based on said estimated channel values and said compensation coefficients;
an equalizing filter that generates an equalized signal by an equalizing process for the received signal that is the frequency domain signal based on said equalized weights;
a residual interference replica generating section that generates residual multipath interference replicas based on frequency domain symbol replicas, said estimated channel values, and said equalized weights; and a first subtracting section that subtracts said residual multipath interference replicas, which are the frequency domain signals, from said equalized signal, which is the frequency domain signal.

2. The receiving device according to claim 1,
wherein said residual interference replica generating section includes:
a first multiplying section that multiplies the estimated frequency domain channel values estimated by said channel estimating section by the equalized weights computed by said weight computing section;
an averaging section that averages the equalized channel gains of subcarriers computed by said first multiplying section so as to obtain averaged equalized channel gains;
a second subtracting section that subtracts the averaged equalized channel gains computed by said averaging section from the equalized channel gains computed by said first multiplying section so as to obtain residual multipath interferences; and
a second multiplying section that multiplies the residual multipath interferences computed by said second subtracting section by the frequency domain symbol replicas.

3. The receiving device according to claim 2,
wherein said compensation coefficient computing section includes:
a hard decision symbol replica generating section that generates a hard decision symbol replica based on said bit likelihood;
a first power computing section that computes a power of the hard decision symbol replica generated by said hard decision symbol replica generating section for each symbol;
a soft decision symbol replica generating section that generates a soft decision symbol replica based on said bit likelihood;
a second power computing section that computes a power of the soft decision symbol replica generated by said soft decision symbol replica generating section for each symbol;
a third subtracting section that subtracts the power of the soft decision symbol replica computed by said second power computing section from the power of the hard decision symbol replica computed by said first power computing section for each symbol; and
an adding section that adds results obtained for individual symbols by said third subtracting section so as to compute said compensation coefficients that take account of the residual multipath interferences.

4. The receiving device according to claim 2,
wherein said weight computing section, said equalizing filter, said residual interference replica generating section, and said first subtracting section iteratively perform their process for the frequency domain so as to remove the residual multipath interferences.

5. The receiving device according to claim 1,
wherein said compensation coefficient computing section includes:
a hard decision symbol replica generating section that generates a hard decision symbol replica based on said bit likelihood;
a first power computing section that computes a power of the hard decision symbol replica generated by said hard decision symbol replica generating section for each symbol;
a soft decision symbol replica generating section that generates a soft decision symbol replica based on said bit likelihood;
a second power computing section that computes a power of the soft decision symbol replica generated by said soft decision symbol replica generating section for each symbol;
a second subtracting section that subtracts the power of the soft decision symbol replica computed by said second power computing section from the power of the hard decision symbol replica computed by said first power computing section for each symbol; and
an adding section that adds results obtained for individual symbols by said second subtracting section so as to compute said compensation coefficients that take account of the residual multipath interferences.

6. The receiving device according to claim 1,
wherein said weight computing section, said equalizing filter, said residual interference replica generating section, and said first subtracting section iteratively perform their process for the frequency domain so as to remove the residual multipath interferences.

7. The receiving device according to claim 1,
wherein said weight computing section computes said equalized weights based on said compensation coefficients that take account of the residual multipath interferences according to a Minimum Mean Square Error method.

8. A receiving method of a receiving device that receives a single carrier signal, comprising:
performing a correlating process for a received reference signal in which said single carrier signal was transformed from a time domain signal into a frequency domain signal and a pre-stored reference signal so as to obtain estimated channel values;
computing compensation coefficients corresponding to residual multipath interferences based on a bit likelihood;
computing equalized weights based on said estimated channel values and said compensation coefficients;
generating an equalized signal by an equalizing process for the received signal that is the frequency domain signal based on said equalized weights;
generating residual multipath interference replicas based on frequency domain symbol replicas, said estimated channel values, and said equalized weights; and
subtracting said residual multipath interference replicas, which are the frequency domain signals, from said equalized signal, which is the frequency domain signal.

9. A non-transitory recording medium that records a program that causes a signal processing section of a receiving device that receives a single carrier signal to operate, comprising the processes of:
performing a correlating process for a received reference signal in which said single carrier signal was transformed from a time domain signal into a frequency domain signal and a pre-stored reference signal so as to obtain estimated channel values;
computing compensation coefficients corresponding to residual multipath interferences based on a bit likelihood;
computing equalized weights based on said estimated channel values and said compensation coefficients;
generating an equalized signal by an equalizing process for the received signal that is the frequency domain signal based on said equalized weights;

generating residual multipath interference replicas based on frequency domain symbol replicas, said estimated channel values, and said equalized weights; and subtracting said residual multipath interference replicas, which are the frequency domain signals, from said equalized signal, which is the frequency domain signal.

* * * * *